UNITED STATES PATENT OFFICE.

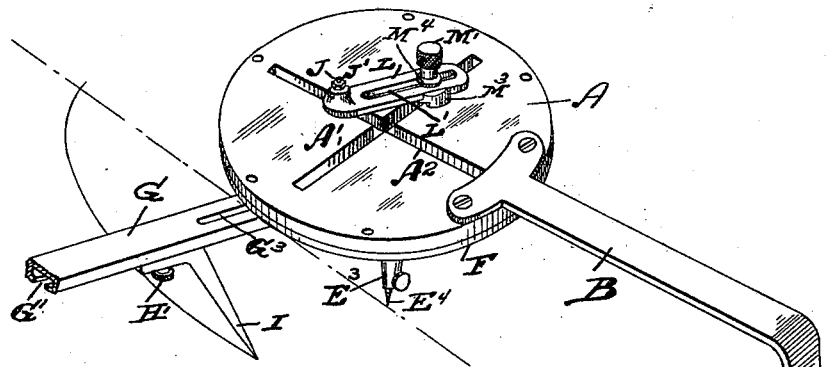
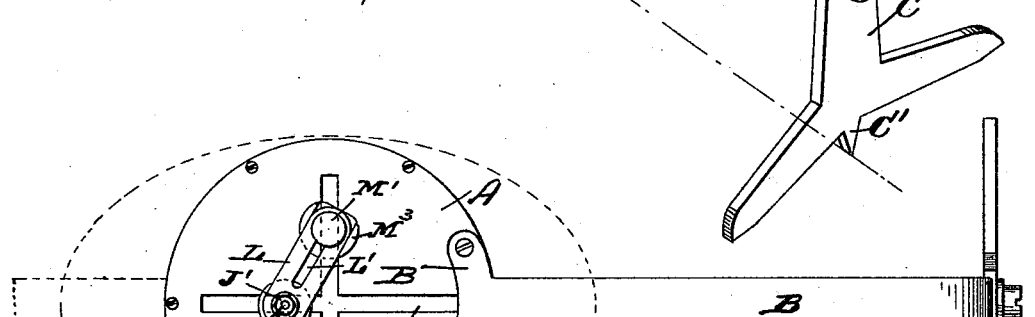
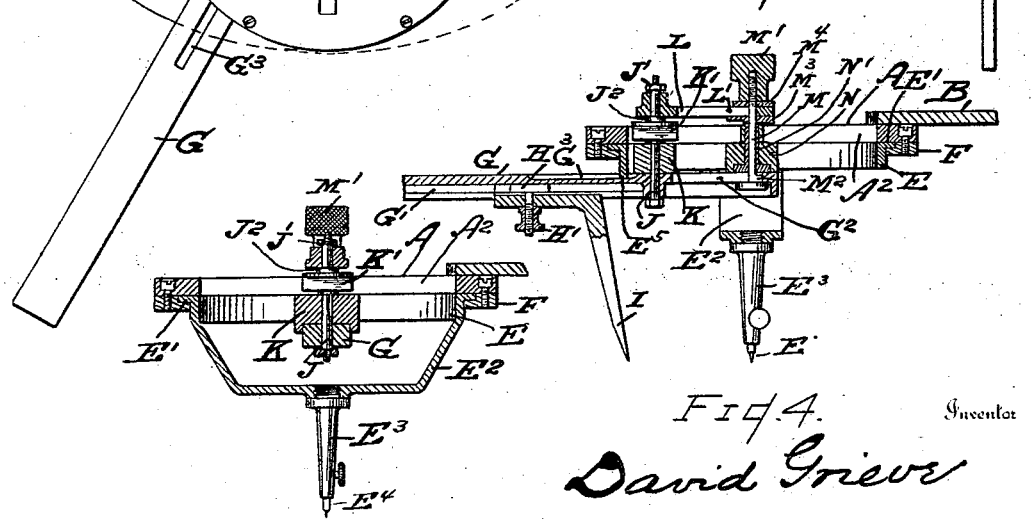

DAVID GRIEVE, OF DETROIT, MICHIGAN.

DRAFTING INSTRUMENT.

1,415,547.      Specification of Letters Patent.      Patented May 9, 1922.

Application filed December 12, 1921. Serial No. 521,674.

*To all whom it may concern:*

Be it known that I, DAVID GRIEVE, subject of Great Britain, residing at Detroit, county of Wayne, State of Michigan, have invented a certain new and useful Improvement in Drafting Instruments, and declare the following to be a full, clear, and exact description of the same, such as will enable others skilled in the art to which it pertains to make and use the same, reference being had to the accompanying drawings, which form a part of this specification.

My invention relates to drafting instruments and especially an instrument for drawing ellipses,—shown in the accompanying drawings, and more particularly described in the following specification and claims.

One object of this invention is to provide an instrument for delineating ellipses of any predetermined major and minor axis within its scope.

A further object of the invention is to provide an instrument in which a pen, pencil, or suitable scribing point may be employed interchangeably in describing an ellipse.

A further object of the invention is to provide an instrument adapted to be supported in spaced relation to the drafting table, whereby it may be accurately positioned upon a line representing the major axis of the proposed ellipse that the draftsman may readily verify and note the progress of his work.

With the foregoing and other objects in view which will appear as the description proceeds the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a perspective view of the instrument with a portion of its swinging beam broken away, showing an ellipse partially described by the scribing point.

Figure 2 is a plan view of the instrument indicating in dotted lines an ellipse formed thereby.

Figure 3 is a sectional view through the hub-plate supporting the swinging beam.

Figure 4 is a cross-sectional view through the hub or circular plate taken at right angles to Figure 3 showing in section a portion of the swinging beam and scribing point attached thereto.

Referring now to the letters of reference placed upon the drawings:

A, denotes a hub or circular plate provided with centrally disposed intersecting slots A' and A². Attached to the hub plate is an alignment bar or bracket arm B, adjustably supported in a vertically grooved foot plate C by a set screw D. Extending downwardly from the foot plate is a V-shaped lug, its knife edge C' serving to assist the draughtsman in positioning the instrument upon a line previously drawn representing the major axis of the ellipse to be described. E, denotes a rotatable annulus having an outstanding flange E' lying adjacent to the under face of the hub plate, and F is a ring secured to the hub plate and overlapping the flange thus securing the annulus to the plate, while permitting its rotation. Bridging the annulus E and preferably integral therewith is a depending cross bar E² tapped centrally to receive the threaded end of an adjustable needle holder E³ in which is secured a fixed pivot pin. G, denotes a swinging beam having a slot and groove G' on its underside to receive and support the head of a slidable bolt H, fitted with a thumb nut H' for securing either a scribing point I or a suitable pen, or pencil holder as may be required. J, denotes a bolt extending up through a bore in the beam and through a block K slidable on the under-face of the circular hub;—the bolt J also extends through a block K' guided by and slidable in the slot A² of the hub plate. L, is a slotted link bar bored at one end to receive the bolt J;—a nut J' being screwed to the bolt to secure the link thereto. J² indicates a shoulder integral with the bolt against which the link L bears that the latter may be held in spaced relation to the top of the hub-plate to permit a free movement of the link when the nut J' is adjusted to secure the parts together. M, is a bolt fitted with a thumb nut M' extending through a slot G² in the end of the beam G and through a bushing N' in the block N, in turn slidable in the slot A' of the hub plate. The bolt M has a lug M² between the walls of the slot G² to prevent rotation upon its axis and extending upwardly it projects through a slot L' in the link L. M³ is a disc bored for the bolt overlapping the hub plate and is grooved to receive the link L to which it is secured by the bolt M:—a washer M⁴ being located between the thumb nut M' and the link. To provide for a positive rotation of the annulus E the swinging beam G, is formed with a groove G³ on its upper face to receive a depending lug E⁵ integral with the lower edge of the annulus, thus insuring the rotation of the latter upon swinging the beam to describe an ellipse.

To set the instrument for describing an ellipse of a given major and minor axis, the swinging beam G is first turned to a position at right angles to the alignment bar B and the scribing point, pen or pencil is then adjusted on the swinging beam to a position representing one-half the minor axis of the proposed ellipse with respect to the needle E⁴ or fixed point. The swinging beam is then turned parallel with the alignment bar B, the set screw M' is then adjusted to release the swinging beam G and link L. The beam is then adjusted so that the scribing point I, or other like instrument employed is spaced from the fixed or needle point F' one-half the major axis of the proposed ellipse, the set screw M' is then regulated to secure the swinging beam in its adjusted relation to the needle point. A line indicating the long axis of the proposed ellipse having been first drawn, the draughtsman places the instrument thereon so that the needle or fixed point will be midway of the major axis of the proposed ellipse with the knife edge C' of the foot member C (which may be adjusted vertically by the set screw D) resting upon the line. The instrument is then held against displacement and the swinging beam turned thereby causing the blocks K' and N to slide in their respective slots A' and A² of the hub plate thus forcing the swinging beam to move so that the scribing point or other like instrument secured thereto describes the predetermined ellipse.

Having thus described my invention what I claim is:

1. In an instrument of the class described, a plate having intersecting slots, a pair of slidable elements linked together mounted in the slots of the plate, a rotatable element carried by the plate having a central pivot pin, means carried by the plate co-operating with the pivot pin in supporting the instrument in spaced relation to a drafting board and in line with the predetermined axis of an ellipse to be described, a swinging beam pivotally connected with one of the slidable linked elements and adjustably connected with the slidable linked element and also with the rotatable element carried by the plate, and a scribing element adjustable upon the swinging beam.

2. In an instrument of the class described, a plate having intersecting slots, slidable elements mounted in the slots of the plate, means for adjustably linking said elements together, a rotatable element carried by the plate having a central pivot pin, an alignment bar attached to the plate, a foot member adjustably connected with the alignment bar and provided with an indicator,—adapted in co-operation with the pivot pin to support the instrument in spaced relation to a drafting board and in line with the predetermined axis of an ellipse to be described, a swinging beam pivotally connected with one of the slidable elements supported in the slots of the plate and adjustably connected with the other slidable element in the plate and also with the rotatable element carried by the plate, and a scribing element adjustable upon the swinging beam.

3. In an instrument of the character described, a hub plate having intersecting slots, a movable member lodged in each of said slots, a slotted link for adjustably connecting said elements together, a rotatable annulus carried by the hub plate fitted with a supporting pivot needle, means whereby said needle may be adjusted vertically, a swinging beam adjustably connected with the annulus and slotted for the passage of a bolt, whereby the beam may be adjusted with reference to the latter, means for pivotally connecting the beam with one of the movable members lodged in the slots of the hub plate, a bolt extending through the slot in the beam to connect the latter with the other movable member mounted in the slot of the hub plate, a scribing element adjustable upon the beam, and an adjustable alignment bar attached to the hub plate adapted to cooperate with the pivot needle in supporting the instrument in spaced relation to the drafting board and upon a line indicating a predetermined axis of the ellipse to be described.

4. In an instrument of the character described, a hub plate having intersecting slots, a rotatable annulus mounted on the underside of said hub plate, said annulus being provided with a projecting flange, a ring overlapping the flange and attached to the hub plate to secure the annulus to the latter, a central pivot pin detachably connected with a cross member of the annulus, a slidable element mounted respectively in each of the slots of the hub plate, a slotted link for providing an adjustable connection between said elements, a swinging beam pivotally connected with one of said elements and having a longitudinally slidable connection with the other element and with the annulus, and a scribing member adjustably mounted upon the swinging beam.

5. In an instrument of the class described, a hub plate having intersecting slots fitted with slidable elements movable in said slots, an adjustable link connection between the slidable elements, a rotatable annulus mounted upon the underside of said plate provided with a central pivot pin adapted to support the hub plate in fixed relation to a drafting board, a swinging beam having a pivotal connection with one of the slidable elements of the hub plate and a longitudinal adjustable connection with the other element and with the rotatable annulus, a scribing element adjustably mounted upon the swinging beam, an alignment bar connected with the hub plate, a vertically adjustable foot piece secured to the alignment bar adapted to co-operate with the pivot pin in supporting the instrument in spaced relation to a drafting board and means carried by said foot piece to co-operate with the supporting pin in positioning the instrument upon the predetermined axis of an ellipse to be described.

In testimony whereof, I sign this specification in the presence of two witnesses.

DAVID GRIEVE.

Witnesses:
S. E. THOMAS,
JOHN CONSIDINE.